Figure 1:
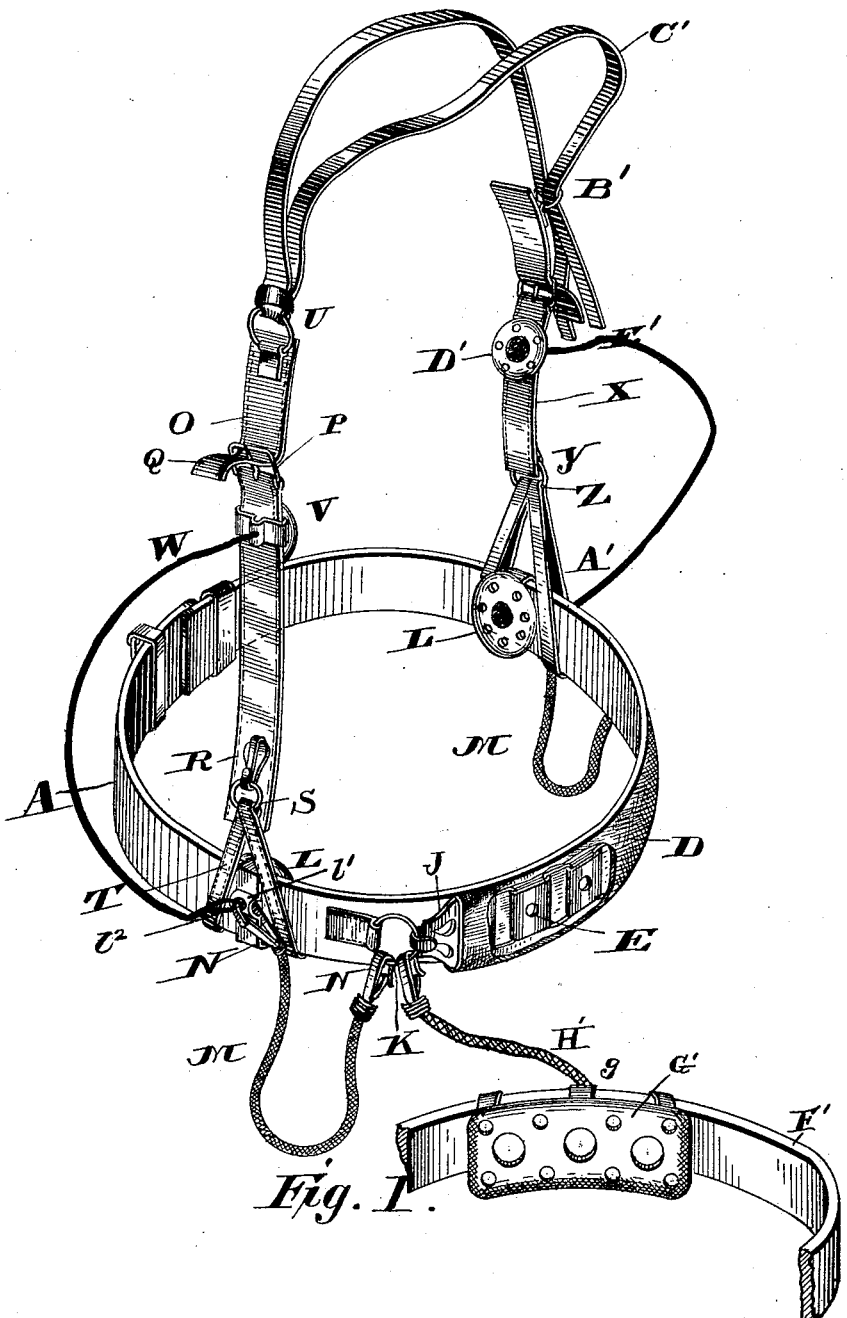

(No Model.) 5 Sheets—Sheet 1.
R. E. WILLIAMS.
ELECTRIC BELT AND APPLIANCES.

No. 434,746. Patented Aug. 19, 1890.

WITNESSES: INVENTOR
F. L. Ourand. Robert E. Williams,
A. L. Morsell. by J. Louis Dagger & Co.,
Attorneys (No Model.) 5 Sheets—Sheet 2.
R. E. WILLIAMS.
ELECTRIC BELT AND APPLIANCES.
No. 434,746. Patented Aug. 19, 1890.
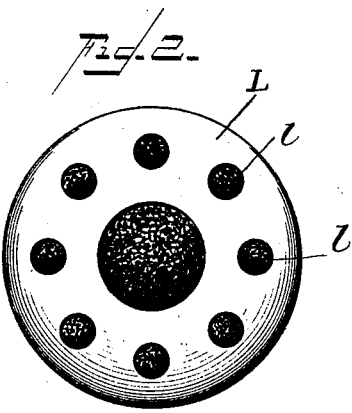
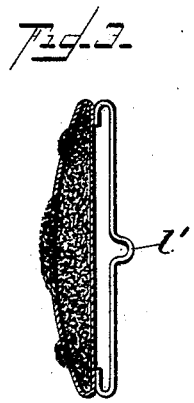
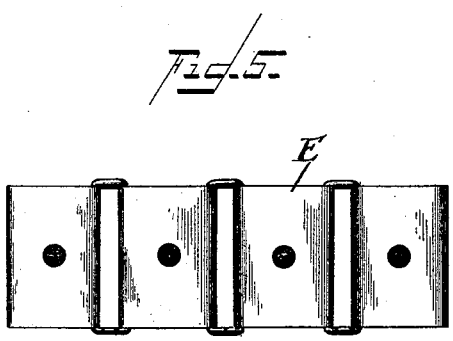
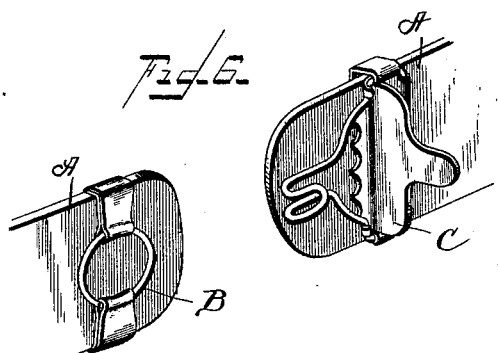
WITNESSES:
F. L. Ourand.
A. L. Morrell.
INVENTOR
Robert E. Williams
by Sanus Bagger & Co.
Attorneys (No Model.) 5 Sheets—Sheet 3.
R. E. WILLIAMS.
ELECTRIC BELT AND APPLIANCES.
No. 434,746. Patented Aug. 19, 1890.
Fig. 7.
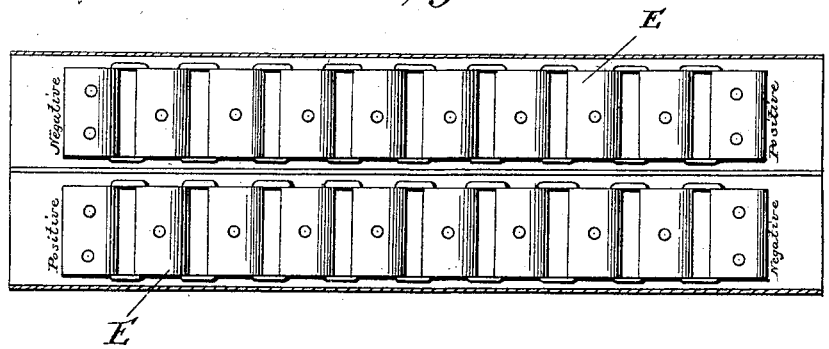
Fig. 8.
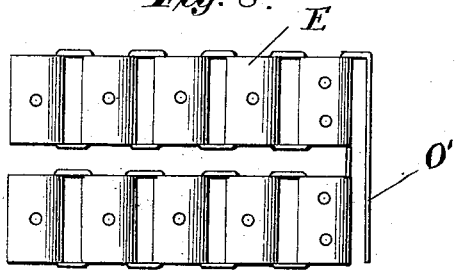
Fig. 9.
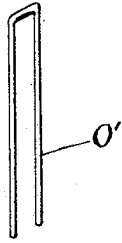
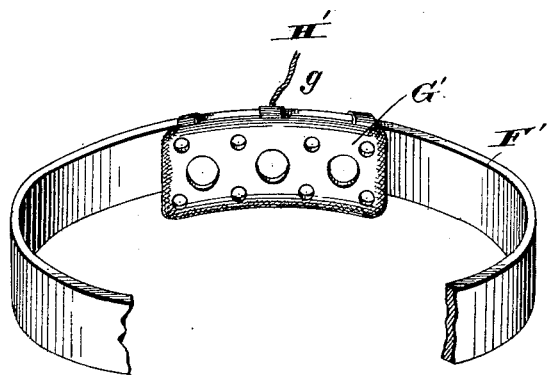
Fig. 10.
WITNESSES
F. L. Durand
A. L. Morsell.
INVENTOR
Robert E. Williams
by James Dagger & Co.
Attorneys
THE NORRIS PETERS CO., PHOTO-LITHO., WASHINGTON, D. C.

(No Model.)
R. E. WILLIAMS.
ELECTRIC BELT AND APPLIANCES.
No. 434,746.   Patented Aug. 19, 1890.
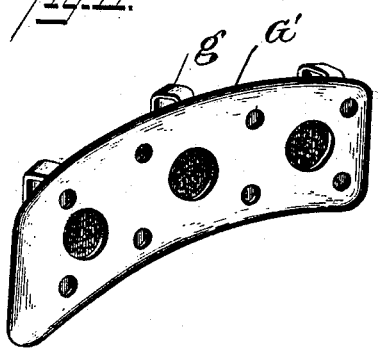
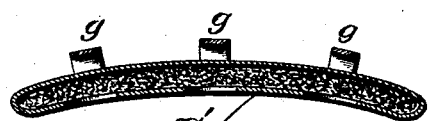
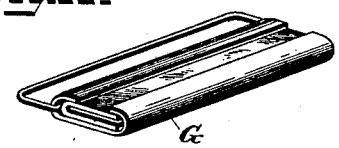
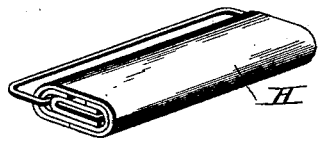
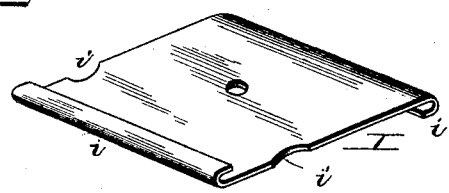
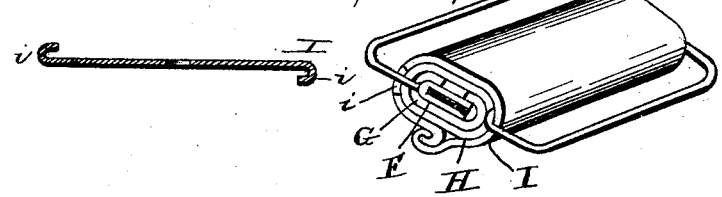
WITNESSES:
F. L. Ourand.
A. L. Morsell.
INVENTOR
Robert E. Williams
by Saus Dagger & Co.
Attorneys.

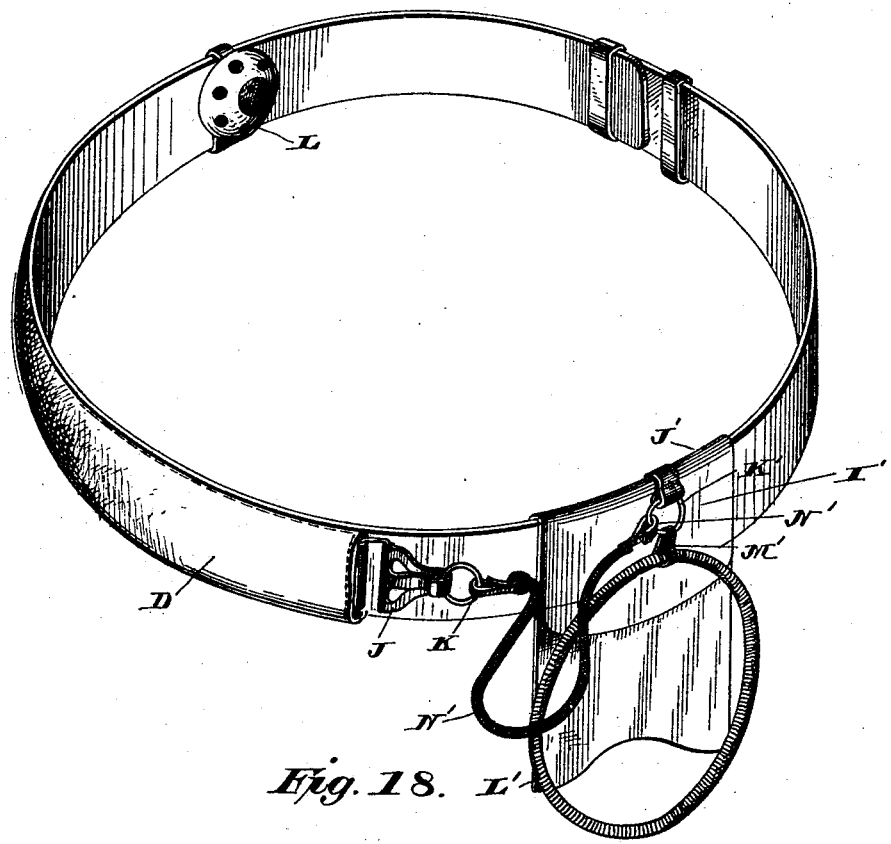

UNITED STATES PATENT OFFICE.

ROBERT E. WILLIAMS, OF DALLAS, TEXAS, ASSIGNOR OF ONE-HALF TO WILBUR F. SHOOK, OF SAME PLACE.

ELECTRIC BELT AND APPLIANCES.

SPECIFICATION forming part of Letters Patent No. 434,746, dated August 19, 1890.

Application filed February 26, 1890. Serial No. 341,844. (No model.)

*To all whom it may concern:*

Be it known that I, ROBERT E. WILLIAMS, a citizen of the United States, and a resident of Dallas, in the county of Dallas and State of Texas, have invented certain new and useful Improvements in Electric Belts and Appliances; and I do hereby declare that the following is a full, clear, and exact description of the invention, which will enable others skilled in the art to which it appertains to make and use the same.

My invention has relation to improvements in electric belts and appliances.

The object of the invention is to produce a belt of this character which shall present a construction offering but little discomfort to the wearer, and at the same time producing superior results medicinally.

Furthermore, it consists in providing a belt with electrodes adjustable thereon, so as to reach different portions of the body of the patient.

A further object consists in providing an improved battery in connection with the belt, consisting of a series of plates so constructed as to cause the currents to be generated almost entirely from the filling or extra zinc plates, and to provide a simple means for substituting new plates or fillings after the former ones have been eaten up or their efficiency impaired by the electric current.

A still further object consists in providing different attachments or appliances for the belt, whereby various portions of the body of the user are reached, all of said appliances being electrically connected to the belt.

With these and other objects in view the invention consists in the improved construction and combination of parts, as hereinafter more fully pointed out and described.

In the accompanying drawings, Figure 1 is a perspective view of the belt, showing the chest attachment in position, also the spine attachment with its connecting ribbons or straps secured to the upper end of the breast attachment, a portion of the casing being broken away to show the battery, also showing the attachment for the feet, legs, or arms, with proper connection between the same and the belt proper. Fig. 2 is an elevation of the rear side of one of the electrodes used upon the belt. Fig. 3 is a cross-sectional view of the same. Fig. 4 is an elevation of the rear side of a modified form of electrode used in connection with the spine attachment. Fig. 5 is a detail of a single battery. Fig. 6 is a perspective view of the two ends of the belt, showing the ends disengaged. Fig. 7 is a side elevation of a double battery sometimes used in connection with the belt, showing one side of the rubber lining of the casing provided with a central ridge for separating the two side sections. Fig. 8 is an end section of this form of battery, showing the two sections connected by a wire connection. Fig. 9 is a detail view of this connection. Fig. 10 is a detail view of the elastic band and its curved electrode intended for application to the more distant parts of the body. Fig. 11 is a detail view in perspective of the electrode used in connection with this attachment. Fig. 12 is a longitudinal section thereof. Fig. 13 is a detail view of the innermost plate of one of the small sections of the battery. Fig. 14 is a detail view of the open sleeve incasing the same with the wire bail in position therein. Fig. 15 is a detail view showing the inner plate with its surrounding sleeve and the felt cloth surrounding the latter. Fig. 16 is a detail view of the outer copper blank. Fig. 17 is a longitudinal section of the same. Fig. 17ª is a detail perspective of one of the complete cells forming the battery. Fig. 18 is a view of the belt, showing one of the electrodes removed and my attachment for the generative organs applied in place thereof.

Like letters of reference refer to like parts throughout the several views.

Referring to the drawings, the letter A indicates the belt proper, one end thereof provided with a ring or eye B, which is adapted to be engaged by an ordinary suspender hook or buckle C, whereby the belt may be made adjustable, so as to fit persons of different sizes.

One portion of the belt is provided with a casing D, which is rubber-lined and a non-conductor. Within this casing is arranged my improved battery E, each section of said battery being composed of copper and zinc, adjusted and arranged in the following manner: The innermost plate F consists of a folded piece of zinc. This plate is incased by an open zinc sleeve G. Surrounding this sleeve is a piece of felt cloth H, while all the elements just described are surrounded by a copper blank I, as shown in Fig. 16 of the drawings, said blank of course being made to incase the parts mentioned by properly bending the same into requisite form. This blank, as will be seen, has oppositely-bent ends $i$ $i$, which are adapted to interlock and form a firm seam, and said blank also has its opposite side edges at one end cut out or concaved, indicated by the letters $i'$ $i'$. These concaved edges, when the blank incases the other elements, are disposed at the end of the cell at which the wire connecting link or bail contacts with inner zinc sleeve G, the cut-away portion serving to prevent said bail from also contacting with the copper blank. The opposite end of the blank is not provided with these notches, inasmuch as it is necessary for the connecting links or bails to contact at this end of said copper blanks. The battery thus incased may be a single battery, the sections thereof being wide enough to snugly fit the casing, or it may be a double battery, such as shown in Fig. 7 of the drawings. When this latter construction is employed, the two side sections may be either connected or not, as desired. When connected, however, I employ the connecting-wire illustrated in Figs. 8 and 9 of the drawings, thus forming a continuous circuit between the side sections.

It is obvious that, if preferred, more than one casing may be used upon the belt, in which case of course each casing may contain a single battery or a double battery of the nature just described.

Each end loop or bail of the battery is provided with a suitable metallic buckle or catch J, which attach to rings K K, secured to the belt.

The letters L L indicate the front and rear electrodes of the belt. These electrodes are disk-shaped and in the form of a cup or receptacle designed to contain sponge or like material, the inner faces of said cups or the faces which bear against the body of the person being perforated, as shown at $l$, so that portions of the sponge will be in contact with the body of the wearer. This sponge is saturated with a sufficient quantity of water to keep moist a long time, thereby preventing the disagreeable stinging or burning sensation from the currents of the battery. Extending from the front faces of these electrodes are loops or bands $l'$, provided with a central perforated ridge $l^2$. The electrodes are thus secured in place by passing the belt through these loops, thus providing, also, for their convenient adjustment upon the belt.

In the drawings I have shown two of these electrodes upon the belt—one situated at the front and the other at the rear. It is, however, of course optional with me to use a greater number.

Electrical connection is attained between the battery and the electrodes by means of insulated wires M M, provided on opposite ends with hooks N N, one of said hooks of each electrode adapted to engage the rings K and the other hook the perforation of the ridge $l^2$ of the electrode.

The letter O indicates a front breast strap or attachment, said attachment being composed, preferably, of two sections united centrally by means of a suitable suspender buckle or hook P, secured to one of the sections, engaging the end Q of the other section, whereby the strap or attachment is made adjustable in a similar manner to the belt proper.

The lower end of the breast attachment is provided with a hook R, which engages a ring S, secured to a loop-band T, which latter surrounds belt A, and the outer end of the attachment is provided with a ring U. The attachment is also provided with one or more electrodes V, one only being shown in the drawings, which, being similar in all respects to the electrodes upon the belt proper, need no further description. This electrode is connected to the front end of the battery by means of an insulated wire W.

The letter X indicates a spine attachment, said attachment consisting of a strap of two sections made adjustable in a similar manner to the breast attachment. The lower end of the strap is provided with a hook Y, which engages a ring Z, secured to a band-loop A', which latter surrounds the belt at its rear, and its upper end is provided with a ring B'. To this ring is looped a ribbon or strap C', the ends of said strap or ribbon passing up over the shoulders of the wearer and the ends thereof secured to the ring U upon the upper end of the breast attachment. When, however, this spine attachment just described is not employed, the ribbon or strap may be looped to the upper ring of the breast attachment and the ends thereof passed around the neck of the wearer. The spine attachment also carries one or more electrodes D', similar in all respects to the other electrodes described, except that it is oblong in form instead of disk-shaped, and is connected to the rear end of the battery by means of an insulated wire E'.

The letter F' indicates an elastic adjustable belt intended more especially for parts of the body distant from the battery which none of the other attachments would reach—as, for instance, the feet, legs, and arms. Upon this belt is arranged an electrode G', which is rectangular in shape and slightly curved to secure a neat fit. Its inner side is of cup form and designed to contain sponge or like substance, which is exposed to the body through suitable perforations therein. It is also provided with a front loop $g$, through which the elastic belt passes. This construction, however, may be simplified by merely making the plate of a single piece of curved perforated metal instead of a cupped or hollowed plate and inserting between the same and the inner face of the belt a piece of felt cloth to take the place of sponge. When this attachment is employed, the front electrode of the belt A may be dispensed with and the electrode G' connected with the front end of the battery by means of an insulated wire H'; or, if preferred, the insulated wire may be connected with the ring K without the necessity of dispensing with the front electrode of the belt, as clearly shown in Fig. 1.

Fig. 18 of the drawings shows the belt provided with an attachment for the generative organs. When this attachment is employed, the front electrode is dispensed with and the attachment occupies the same relative position upon the belt. It consists of a rubber shield or guard I', provided at its upper end with a loop J', through which the belt passes. It also has secured to its front face a ring K', which connects with a spiral annular spring L' by means of a hook M'. This spiral spring is connected to the front end of the battery by means of an insulated wire N'. The shield, as will be readily seen, prevents the current from the spiral spring from touching the lower parts of the abdomen and conveys the entire current to the organ it is intended for through the medium of the lower portion of the spring, which is not in contact with the shield.

From the foregoing description, taken in connection with the accompanying drawings, the operation and construction of my improvement will be readily understood.

It will be seen that the belt is adjustable and can be used by persons of different sizes. The electrodes also are adjustable upon the belt, and by making the disk portions thereof cupped or hollowed the sponge contained therein will contact with the body and prevent the disagreeable stinging or burning sensation from the currents of the battery.

My battery will last longer than the usual batteries used in belts, being in fact as near indestructible as can be made, as the zinc plates can be shoved out when exhausted and replaced by fresh ones. To attain this desirable end I coat the zinc sleeve G with a suitble substance to prevent it from being entirely consumed by the acid, and the currents will be consequently almost entirely generated from the fillings of extra zinc plates F, which, as will be readily understood from the drawings, may be easily removed and replaced by new ones when considerably worn or consumed. Experience has proven that the zinc covering used in batteries of this description and similar to the sleeve G are soon eaten up. By my improved plan, however, the battery can be replenished by very little trouble and expense. As previously stated, also, the casing upon the belt is designed to contain either a wide single battery or a double battery. When the latter is employed, the side sections thereof may be disconnected, so as to provide for generating separate currents to the different attachments, or they may be connected by a wire connection O' shown and described by me. When thus connected, they form a very powerful battery. The single battery, however, will perhaps be preferable, as it is cheaper, while the current would not be quite so strong, although sufficiently strong for family use.

Having thus described my invention, what I claim, and desire to secure by Letters Patent of the United States, is—

1. In a battery for electric belts and the like, consisting of a series of connected cells, the combination, with an innermost folded zinc plate, of a zinc sleeve incasing the same, felt cloth surrounding said sleeve, a wire connecting link or bail contacting with this zinc sleeve, an outer casing of copper having its edges at the end adjacent to the bail which contact with the zinc sleeve cut away or concaved, and a wire bail connecting with the opposite end of the copper blank, substantially as set forth.

2. In an electric belt, the combination of a belt proper provided with a rubber-lined casing, a battery within said casing, electrodes upon the belt, wires for electrically connecting said electrodes with the ends of the battery, a band or loop secured to the belt and provided at its upper end with a ring, an adjustable breast attachment provided at its upper end with a ring and at its lower end with a hook, the latter engaging the ring of the loop or band, an adjustable electrode upon said attachment, straps or ribbons secured to the ring at the upper end of the attachment, and wires for securing electrical connection between the electrode of the breast attachment and the battery of the belt, substantially as set forth.

3. In an electric belt, the combination of a belt proper provided with a rubber-lined casing, a battery within said casing, electrodes upon the belt, wires for electrically connecting said electrodes with the ends of the battery, a band or loop secured to the front end of the belt, provided at its upper end with a ring, an adjustable breast attachment provided at its upper end with a ring and at its lower end with a hook, the latter engaging the ring of the loop or band, an adjustable electrode upon said attachment, wires for electrically connecting the electrode of the breast attachment with the battery, a band or loop secured to the rear of the belt, provided at its upper end with a ring, an adjustable spine attachment provided at its upper end with a ring and at its lower end with a hook, the latter engaging the ring of the loop or band, an adjustable electrode upon said attachment, a ribbon or strap looped to the upper ring of this attachment at its center and the ends thereof secured to the upper ring of the breast attachment, and wires for electrically connecting the electrode of the spine attachment with the battery of the belt, substantially as set forth.

4. In an electric belt, the combination, with a belt proper provided with a rubber-lined casing, a battery within said casing, a rubber guard or shield provided at its upper end with a loop through which the belt passes, and also having a ring secured thereto, a spiral spring connected to said ring by means of a metallic hook, said spiral spring having its lower end extending below the guard or shield, and wires for electrically connecting the spiral spring with the battery, substantially as set forth.

5. An outer casing for the connected plates of galvanic batteries, consisting of a copper blank having its ends bent in opposite directions and adapted to interlock so as to form a seam, and having its opposite side edges cut away or concave, substantially as set forth.

6. In a battery for electric belts and the like, the combination, with a belt proper, of a rubber-lined casing, said rubber lining provided with a central ridge, a battery within said casing, consisting of an upper and lower section separated by said central ridge, and a wire bent into U form for connecting the ends of the battery, substantially as set forth.

In testimony that I claim the foregoing as my own I have hereunto affixed my signature in presence of two witnesses.

ROBERT E. WILLIAMS.

Witnesses:
F. L. RANDLE,
I. G. RANDLE.